| United States Patent [19] | [11] Patent Number: 4,579,919 |
| Staiger et al. | [45] Date of Patent: Apr. 1, 1986 |

[54] PREPARATION OF HOMOPOLYMERS AND COPOLYMERS OF α-MONOOLEFINS USING A ZIEGLER-NATTA CATALYST SYSTEM

[75] Inventors: Gerhard Staiger, Bobenheim-Roxheim; Wolfgang Gruber, Frankenthal, both of Fed. Rep. of Germany

[73] Assignee: BASF Aktiengesellschaft, Fed. Rep. of Germany

[21] Appl. No.: 673,337

[22] Filed: Nov. 20, 1984

[30] Foreign Application Priority Data

Nov. 22, 1983 [DE] Fed. Rep. of Germany ....... 3342039

[51] Int. Cl.$^4$ .......................... C08F 4/02; C08F 10/00
[52] U.S. Cl. .................................. 526/119; 502/125; 502/133; 526/124; 526/351
[58] Field of Search ............................ 526/119, 124

[56] References Cited

U.S. PATENT DOCUMENTS

| 4,180,636 | 12/1979 | Hirota et al. | 526/125 |
| 4,220,554 | 9/1980 | Scata et al. | 526/124 |
| 4,224,184 | 9/1980 | Staiger | 526/124 |
| 4,456,695 | 6/1984 | Nimura et al. | 526/119 |

FOREIGN PATENT DOCUMENTS

| 0036536 | 7/1981 | European Pat. Off. |
| 45976 | 8/1981 | European Pat. Off. ............ 526/128 |
| 0017895 | 12/1982 | European Pat. Off. |
| 2040967 | 9/1980 | United Kingdom ................ 526/125 |

*Primary Examiner*—Edward J. Smith
*Attorney, Agent, or Firm*—Keil & Weinkauf

[57] ABSTRACT

α-Monoolefins are polymerized using a catalyst system which comprises (1) a titanium component obtained by first (1.a) preparing an intermediate from (1.a.1) titanium tetrachloride, (1.a.2) a modifier and (1.a.3) a magnesium alcoholate, and the (1.b) preparing the titanium component from (1.b.1) titanium tetrachloride, (1.b.2) the intermediate from (1.a) and, if required, (1.b.3) a further modifier, (2) an alkylaluminum and (3) a cocatalyst. In this process, (i) the titanium component (1) used is obtained by first (1.1) preparing a first intermediate from (1.1.1) titanium tetrachloride, (1.1.2) a modifier obtained from (1.1.2.1) a titanate and (1.1.2.2) a phthaloyl dichloride, and (1.1.3) a magnesium alcoholate, then (1.2) preparing a second intermediate from (1.2.1) titanium tetrachloride, (1.2.2) the intermediate from (1.1) and, if required, (1.2.3) a phthaloyl dichloride as a further modifier, and finally (1.3) preparing the titanium component from (1.3.1) titanium tetrachloride and (1.3.2) the intermediate from (1.2), and (ii) the cocatalyst (3) used is a trialkoxysilane.

4 Claims, No Drawings

PREPARATION OF HOMOPOLYMERS AND COPOLYMERS OF α-MONOOLEFINS USING A ZIEGLER-NATTA CATALYST SYSTEM

The present invention relates to a process for the preparation of homopolymers and copolymers of $C_2$–$C_{12}$–α-monoolefins, in particular $C_2$–$C_6$–α-monoolefins, at from 20° to 160° C., in particular from 50° to 120° C., under from 1 to 100, in particular from 20 to 70, bar, using a Ziegler-Natta catalyst system comprising (1) a modified titanium component obtained by a method in which
  (1.a) first
    (1.a.1) titanium tetrachloride,
    (1.a.2) a modifier and
    (1.a.3) a magnesium alcoholate which has a particle diameter of from 0.05 to 5.0 mm, in particular from 0.5 to 3 mm, and is of the formula $Mg(OR^1)_2$, where $R^1$ is a monovalent saturated aliphatic and/or aromatic hydrocarbon radical of not more than 10, preferably not more than 8, carbon atoms, in particular alkyL of not more than 4 carbon atoms, are reacted to give a solid intermediate, and
  (1.b) then
    (1.b.1) titanium tetrachloride,
    (1.b.2) the solid intermediate obtained in (1.a) and, if required,
    (1.b.3) a further modifier are reacted to give a solid (the modified titanium component (1)), (2) an alkyl-aluminum of the formula $AlR^2_3$, where $R^2$ is alkyl of not more than 8, in particular not more than 4, carbon atoms, and (3) a cocatalyst, with the provisos that the atomic ratio of titanium from the modified titanium component (1) to aluminum from the alkyl-aluminum (2) is from 1:10 to 1:500, in particular from 1:20 to 1:200 and the molar ratio of the alkyl-aluminum (2) to the cocatalyst (3) is from 10:8 to 10:0.3, in particular from 10:5 to 10:0.5.

Polymerization processes of this type are known; they are distinguished from other similar processes by the special embodiment of the catalyst system, and the processes disclosed in European Pat. No. 17,895 and European Laid-Open Application 36,536 may be mentioned as prototyoes for the present case.

The special embodiments of the catalyst system are produced in order to achieve certain aims, such as the following:

(A) Catalyst systems which give polymerization products with a high proportion of stereoregular (isotactic) polymer in the polymerization of α-monoolefins, in particular propylene.

(B) Catalyst systems which are capable of giving a high yield of polymer, i.e. systems with a high productivity, i.e. systems in which the amount of polymer formed per unit weight of the catalyst system is increased.

(C) Catalyst systems which introduce less halogen into the polymer; this can be achieved by increasing the yield as described in (B) and/or using a titanium halide which contains very little halogen.

(D) Catalyst systems whose maximum activity remains constant or relatively constant over a very long period; this is of great importance not only with regard to the catalyst yields but also in the preparation of homopolymers and copolymers, in particular block copolymers, by the cascade process.

(E) Catalyst systems which influence the morphological properties of the polymers in a certain way, for example giving uniform particle size and/or reducing the fractions of very fine particles and/or giving a high bulk density; this may be important, for example, with regard to mastering the polymerization systems technically or working up the polymers and/or for the process ability of the polymers.

(F) Catalyst systems which make it possible to manage with a relatively small amount of regulator in the polymerization in the presence of a molecular weight regulator, in particular hydrogen; this may be important, for example, for the thermodynamics of the procedure.

(G) Catalyst systems tailored to special polymerization processes, for example those which are adapted to the specific features of either suspension polymerization or dry-phase polymerization.

(H) Catalyst systems which give polymers whose spectrum of properties makes them particularly suitable for one field of use or another.

From experience to date, there are, among the various aims, some which can be achieved by means of particular embodiments of the catalyst system only if other aims are neglected.

Under these circumstances, it is generally desirable to find those embodiments which not only allow the selected aims to be achieved but also result in other desirable aims being neglected as little as possible.

It is an object of the present invention to provide a novel embodiment of a catalyst system by means of which, with similar aims, better results can be achieved compared with conventional embodiments, i.e. better results with regard to the aims listed above under (C) and (D) while neglecting the aims stated under (E) and (G) as little as possible.

We have found that this object is achieved by means of a catalyst system of the type defined at the outset, which (i) contains, as the modified titanium component (1), a component prepared in a particular manner, in three stages, from special starting materials, and (ii) a trialkoxysilane of a certain type, as cocatalyst (3).

The present invention accordingly relates to a process for the preparation of homopolymers and copolymers of $C_2$-$C_{12}$-α-monoolefins, in particular $C_2$-$C_6$-α-monoolefins, at from 20° to 160° C., in particular from 50° to 120° C., under from 1 to 100, in particular from 20 to 70, bar, using a Ziegler-Natta catalyst system comprising (1) a modified titanium component obtained by a method in which
  (1.a) first
    (1.a.1) titanium tetrachloride,
    (1.a.2) a modifier and
    (1.a.3) a magnesium alcoholate which has a particle diameter of from 0.05 to 5.0 mm, in particular from 0.5 to 3 mm, and is of the formula $Mg(OR^1)_2$, where $R^1$ is a monovalent saturated aliphatic and/or aromatic hydrocarbon radical of not more than 10, preferably not more than 8, carbon atoms, in particular alkyl of not more than 4 carbon atoms, are reacted to give a solid intermediate, and
  (1.b) then
    (1.b.1) titanium tetrachloride,
    (1.b.2) the solid intermediate obtained in (1.a) and, if required, (1.b.3) a further modifier are reacted to give a solid (the modified titanium component (1)), (2) an alkyl-aluminum of the formula $AlR^2_3$, where $R^2$ is alkyl of not more than 8, in particular not more than 4, carbon atoms, and (3) a cocatalyst, with the provisos that the atomic ratio of titanium from the modified titanium component (1) to aluminum from the alkyl-aluminum (2) is from 1:10 to 1:500, in particular from 1:20 to 1:200 and the molar ratio of the alkyl-aluminum (2) to the cocatalyst (3) is from 10:8 to 10:0.3, in particular from 10:5 to 10:0.5.

In the process according to the invention, (i) the modified titanium component (1) employed is one obtained by a method in which (1.1) in a first stage, a mixture of (1.1.1) titanium tetrachloride, (1.1.2) a modifier consisting of (1.1.2.1) a titanate of the formula $Ti(OR^3)_4$, where $R^3$ is a monovalent saturated aliphatic and/or aromatic hydrocarbon radical of not more than 10, preferably not more than 8, carbon atoms, in particular alkyl of not more than 6 carbon atoms, and (1.1.2.2) o-, m- and/or p-phthaloyl dichloride, in particular o-phthaloyl dichlbride, and (1.1.3) the magnesium alcoholate, from 4 to 20, in particular from 8 to 14, molar parts of the magnesium alcoholate being employed per 100 molar parts of the titanium tetrachloride, and from 3 to 100, in particular from 20 to 60, molar parts of the titanate as well as from 5 to 50, in particular from 10 to 30, molar parts of the acyl dichloride being employed per 100 molar parts of the magnesium alcoholate, is kept at from 40° to 180° C., in particular from 80° to 140° C., for from 0.1 to 2 hours, in particular from 0.2 to 0.5 hour, while mixing thoroughly and constantly, and the resulting solid intermediate is isolated by separating off the remaining liquid phase, and then (1.2) in a second stage, a mixture of (1.2.1) titanium tetrachloride, (1.2.2) the solid intermediate resulting from stage (1.1), and, if required, (1.2.3) o-, m- and/or p-phthaloyl dichloride, in particular o-phthaloyl dichloride, as a further modifier, from 1 to 50, in particular from 1 to 20, parts by weight of the intermediate as well as not more than 15, in particular from 1 to 7, parts by weight of the acyl dichloride being employed per 100 parts by weight of the titanium tetrachloride, is kept at from 40° to 180° C., in particular from 80° to 140° C., for from 0.1 to 2 hours, in particular from 0.2 to 0.8 hour, while stirring thoroughly and constantly, and the resulting solid intermediate is isolated by separating off the remaining liquid phase, and finally, (1.3) in a third stage, a mixture of (1.3.1) titanium tetrachloride and (1.3.2) the solid intermediate resulting from stage (1.2), from 1 to 50, in particular from 1 to 20, parts by weight of the intermediate being employed per 100 parts by weight of the titanium tetrachloride, is kept at from 40° to 180° C., in particular from 80° to 140 °C., for from 0.1 to 2 hours, in particular from 0.2 to 0.8 hour, while mixing thoroughly and constantly, and the resulting solid (the modified titanium component (1)), is isolated by separating off the remaining liquid phase, and (ii) the cocatalyst (3) employed is a trialkoxysilane of the formula $R^4Si(OR^5)_3$, where $R^4$ is phenyl or $R^5$, and $R^5$ is alkyl of not more than 8, in particular not more than 4, carbon atoms.

Regarding the novel process, the following may be stated specifically:

Provided that the characteristic features are taken into account, the polymerization process as such can be carried out in virtually any relevant conventional technological embodiment, for example suspension polymerization or dry-phase polymerization by a batchwise, semi-continuous or continuous procedure. The technological embodiments mentioned, i.e. the technological variants of the Ziegler-Natta polymerization of α-monoolefins, are well known from the literature and in practice, so that a more detailed description of this is unnecessary here.

For the sake of completeness, it may be stated that, in the process according to the invention, it is also possible to regulate the molecular weights of the polymers by the relevant conventional measures, for example using regulators, in particular hydrogen.

It may furthermore be stated that, in the process according to the invention, the components of the catalyst system can be introduced into the polymerization space in a large variety of ways, for example (i) the modified titanium component (1), the alkyl-aluminum (2) and the cocatalyst (3) as three components, all together at one point, (ii) each of these three components at a separate point, (iii) the modified titanium component (1), on the one hand, and a mixture of (2) and (3), on the other hand, at separate points, a procedure which may be particularly advantageous in the dry-phase polymerization process, or (iiii) a mixture of the modified titanium component (1) and the cocatalyst (3), on the one hand, and the alkyl-aluminum (2), on the other hand, at separate points.

Regarding the composition of the novel catalyst system, the following may be stated specifically:

(1) The titanium tetrachloride (1.1.1), (1.2.1) and (1.3.1) employed for the preparation of the modified titanium component (1) should be a titanium tetrachloride conventionally used in Ziegler-Natta catalyst systems.

The titanate (1.1.2.1) also employed should likewise be a titanate conventionally used in Ziegler-Natta catalyst systems; its alcohol component is based on a monovalent saturated aliphatic and/or aromatic hydrocarbon radical of not more than 10, preferably not more than 8, carbon atoms, in particular alkyl of not more than 6 carbon atoms. We have found that the most suitable esters are those of the above formula in which $R^3$ is alkyl of 4 or 5 carbon atoms, specific examples being the titanates of n-butanol, of isobutanol, of tert.-butanol, of n-pentanol, of isopentanol and of 2,2-dimethylpropanol. The titanates can be employed as individual compounds or in the form of mixtures of two or more individual compounds.

The o-, m- or p-phthaloyl dichloride (1.1.2.2) and, where relevant, (1.2.3) which is furthermore employed can be a commercial compound; advantageously, it should have a relatively high degree of purity. The acyl dichlorides can likewise be used as individual compounds or in the form of mixtures of two or three individual compounds, and those employed in stage (1.1) and, where relevant, stage (1.2) can be identical or different. The magnesium alcoholate (1.1.3) also employed for the preparation of the modified titanium component (1) can be a conventional compound of the stated formula. Particularly suitable alcoholates are those derived from methyl, ethyl, n-propyl, isopropyl, n-butyl, isobutyl or tert.-butyl alcohol. The alcoholates too can be used as individual compounds or in the form of mixtures of two or more individual compounds.

The preparation of the modified titanium component (1) is simple and can be carried out by the skilled worker without explanation being required. Regarding stages (1.1), (1.2) and (1.3), it need only be mentioned that the solid obtained in each case is advantageously isolated by filtration under suction, and the remaining liquid phase is advantageously separated off by washing with a liquid hydrocarbon until the latter no longer takes up any titanium tetrachloride. Suitable liquid hydrocarbons for this purpose are hydrocarbons of the type which is usually brought into contact with titanium components for catalyst systems of the Ziegler-Natta type (for example in the polymerization of α-monoolefins) without causing damage to the catalyst system or to its titanium component. Examples of suitable hydrocarbons are pentanes, hexanes, heptanes, gasolines and cyclohexane.

(2) Suitable alkyl-aluminums (2) are the relevant conventional ones of the stated formula; they are well known from the literature and in practice, so that they do not require any further description. A typical example is triethyl-aluminum.

(3) The cocatalyst (3) which completes the catalyst system is, according to the invention, a trialkoxysilane of the stated formula; it is preferably a trialkoxyphenylsilane where alkoxy is of not more than four carbon atoms, in particular triethoxyphenylsilane. Examples of other suitable trialkoxyphenylsilanes, in addition to the last-mentioned compound, are tri-n-propoxyphenylsilane and tri-n-butoxyphenylsilane.

The novel process permits homopolymers and copolymers of $C_2$–$C_{12}$-α-monoolefins, in particular $C_2$–$C_6$-α-monoolefins, for example those of the binary or ternary type, including block copolymers, to be prepared in an advantageous manner, particularly suitable α-monoolefins for polymerization being propene, but-1-ene, hex-1-ene and, especially for copolymerization, ethylene, n-oct-1-ene, n-dec-1-ene and n-dodec-1-ene.

EXAMPLE

Preparation of the modified titanium component (1)
The procedure is as follows:
(1.1) in a first stage, a mixture of
(1.1.1) titanium tetrachloride,
(1.1.2) a modifier consisting of
(1.1.2.1) n-butyl titanate and
(1.1.2.2) o-phthaloyl dichloride and and
(1.1.3) a magnesium ethylate having a particle diameter of from 0.5 to 3 mm,
10 molar parts of the magnesium alcoholate being employed per 100 molar parts of the titanium tetrachloride, and 50 molar parts of the titanate as well as 25 molar parts of the acyl dichloride being employed per 100 molar parts of the magnesium alcoholate, is kept at from 115° to 118° C. for 0.25 hour while mixing thoroughly and constantly by vigorous stirring, and the resulting solid intermediate is isolated by separating off the remaining liquid phase by filtration under suction through a glass frit and washing with n-heptane until the wash liquid is colorless, and then
(1.2) in a second stage, a mixture of
(1.2.1) titanium tetrachloride and
(1.2.2) the solid intermediate resulting from stage (1.1), 7 parts by weight of the intermediate being employed per 100 parts by weight of the titanium tetrachloride, is kept at from 128° to 134° C. for 0.5 hour while mixing thoroughly and constantly by vigorous stirring, and the resulting solid intermediate is isolated by separating off the remaining liquid phase by filtration under suction through a glass frit and washing with n-heptane until the wash liquid is colorless, and finally,
(1.3) in a third stage, a mixture of
(1.3.1) titanium tetrachloride and
(1.3.2) the solid intermediate resulting from stage (1.2), 7 parts by weight of the intermediate being employed per 100 parts by weight of the titanium tetrachloride, is kept at from 129° to 132° C. for 0.5 hour while mixing thoroughly and constantly by vigorous stirring, and the resulting solid (the modified titanium component (1)) is isolated by separating off the remaining liquid phase by filtration under suction through a glass frit and washing with n-heptane until the wash liquid is colorless.

The modified titanium component (1) obtained in this manner contains 2.8 percent by weight of titanium.

Polymerization

A stirred vessel is charged with 500 ml of n-heptane, 0.2 millimole, calculated as titanium, of the modified titanium component (1) described above, 10 millimoles of triethyl-aluminum, as the alkyl-aluminum (2), and 1 millimole of triethoxyphenylsilane as the cocatalyst (3).

The actual polymerization is carried out at 60° C. in the course of 3 hours, the mixture being stirred constantly; the monomer used is propylene, which is kept under a constant pressure of 1 bar during the polymerization.

In this procedure, the yield is 420 g of polypropylene per g of titanium component (1); the polymer contains 2.9% of components which are soluble in boiling n-heptane (this being a measure of the stereoregularity) and has excellent morphological properties, in particular very uniform particle shape.

We claim:
1. A process for the preparation of a homopolymer or copolymer of a $C_2$–$C_{12}$-α-monoolefin at from 20° to 160° C. under from 1 to 100 bar using a Ziegler-Natta catalyst system comprising
(1) a modified titanium component obtained by a method in which
 (1.a) first
  (1.a.1) titanium tetrachloride,
  (1.a.2) a modifier and
  (1.a.3) a magnesium alcoholate which has a particle diameter of from 0.5 to 3.0 mm and is of the formula $Mg(OR^1)_2$, where $R^1$ is a monovalent saturated aliphatic and/or aromatic hydrocarbon radical of not more than 10 carbon atoms, reacted to give a solid intermediate, and
 (1.b) then
  (1.b.1) titanium tetrachloride,
  (1.b.2) the solid intermediate obtained in (1. a) are reacted to give a solid (the modified titanium component (1)),
(2) an alkyl-aluminum of the formula $AlR^2_3$, where $R^2$ is alkyl of not more than 8 carbon atoms and
(3) a cocatalyst,
with the provisos that the atomic ratio of titanium from the modified titanium component (1) to aluminum from the alkyl-aluminum (2) is from 1:10 to 1:500 and the molar ratio of the alkyl-aluminum (2) to the cocatalyst (3) is from 10:8 to 10:0.3, wherein
  (i) the modified titanium component (1) employed is one obtained by a method in which
    (1.1) in a first stage, a mixture of
      (1.1.1) titanium tetrachloride,
      (1.1.2) a modifier consisting of
        (1.1.2.1) a titanate of the formula $Ti(OR^3)_4$, where $R^3$ is a monovalent saturated aliphatic and/or aromatic hydrocarbon radical of not more than 10 carbon atoms, and
        (1.1.2.2) o-, m- and/or o-phthaloyl dichloride, and
      (1.1.3) the magnesium alcoholate, from 8 to 14 molar parts of the magnesium alocohlate being employed per 100 molar parts of the titanium tetrachloride, and from 3 to 100 molar parts of the titanate as well as from 5 to 50 molar parts of the acyl dichloride being employed per 100 molar parts of the magnesium alcoholate, is kept at from 40° to 180° C. for from 0.1 to 2 hours while mixing thoroughly and constantly, and the resulting solid intermediate is isolated by separating off the remaining liquid phase, and then
    (1.2) in a second stage, a mixture of
      (1.2.1) titanium tetrachloride
      (1.2.2) the solid intermediate resulting from stage (1.1), from 1 to 50 parts by weight of the intermediate as well as not more than 15 parts by weight of the acyl dichloride being employed per 100 parts by weight of the titanium tetrachloride, is kept at from 40° to 180° C. for from 0.1 to 2 hours while stirring thoroughly and constantly, and the resulting solid intermediate is isolated by separating off the remaining liquid phase, and finally,
    (1.3) in a third stage, a mixture of
      (1.3.1) titanium tetrachloride and
      (1.3.2) the solid intermediate resulting from stage (1.2), from 1 to 50 parts by weight of the intermediate being employed per 100 parts by weight of the titanium tetrachloride, is kept at from 40° to 180° C. for from 0.1 to 2 hours while mixing thoroughly and constantly, and the resulting solid (the modified titanium component (1)), is isolated by separating off the remaining liquid phase, and
  (ii) the cocatalyst (3) employed is a trialkoxysilane of the formula $R^4Si(OR^5)_3$, where $R^4$ is phenyl or $R^5$, and $R^5$ is alkyl of not more than 8 carbon atoms.

2. The process of claim 1, wherein a further modifier (1.b.3) is coreacted to provide the solid titanium component (1).

3. The process of claim 1, wherein the mixture (1.2) includes as a further component (1.2.3) o-, m-, and/or p-phthaloyl dichloride.

4. The process of claim 2, wherein the mixture (1.2) includes as a further component (1.2.3) o-, m-, and/or p-phthaloyl dichloride.

* * * * *

UNITED STATES PATENT AND TRADEMARK OFFICE
CERTIFICATE OF CORRECTION

PATENT NO. : 4,579,919
DATED : April 1, 1986
INVENTOR(S) : Gerhard STAIGER et al.

It is certified that error appears in the above-identified patent and that said Letters Patent is hereby corrected as shown below:

IN THE ABSTRACT

Line 5, after "and" delete "the" and insert --then--.

IN THE CLAIMS

Claim 1, col. 6, line 56, after "atoms," insert --are--.

Signed and Sealed this

Tenth Day of June 1986

[SEAL]

Attest:

Attesting Officer

DONALD J. QUIGG

Commissioner of Patents and Trademarks